United States Patent [19]

Kimura et al.

[11] Patent Number: 5,274,294
[45] Date of Patent: Dec. 28, 1993

[54] VIBRATION WAVE DRIVEN MOTOR

[75] Inventors: Atsushi Kimura, Yokohama; Hiroyuki Seki, Urawa, both of Japan

[73] Assignee: Canon Kabushiki Kaisha, Tokyo, Japan

[21] Appl. No.: 919,390

[22] Filed: Jul. 29, 1992

Related U.S. Application Data

[63] Continuation of Ser. No. 578,230, Sep. 6, 1990.

[30] Foreign Application Priority Data

Sep. 6, 1989 [JP] Japan .................. 1-230597

[51] Int. Cl.⁵ .............................. H01L 41/08
[52] U.S. Cl. ................................. 310/323
[58] Field of Search ................ 310/323, 328, 366

[56] References Cited

U.S. PATENT DOCUMENTS

| | | | |
|---|---|---|---|
| 4,562,373 | 12/1985 | Tokushima et al. | 310/328 |
| 4,692,652 | 9/1987 | Seki et al. | 310/323 |
| 4,786,836 | 11/1988 | Tokushima et al. | 310/323 |
| 4,788,468 | 11/1988 | Izukawa et al. | 310/323 |

FOREIGN PATENT DOCUMENTS

| | | | |
|---|---|---|---|
| 0383309A2 | 8/1990 | European Pat. Off. | |
| 0245482 | 12/1985 | Japan | 310/323 |
| 0220782 | 9/1988 | Japan | 310/323 |
| 1-12881A | 1/1989 | Japan | |
| 2174554A | 11/1986 | United Kingdom | |

Primary Examiner—Mark O. Budd
Attorney, Agent, or Firm—Fitzpatrick, Cella, Harper & Scinto

[57] ABSTRACT

A vibration wave driven motor produces a travelling wave in an elastic body and thereby moves the elastic body relative to a member pressed against the elastic body. The travelling wave is a combination of a plurality of standing waves generated by application of out-of-phase alternate electric fields to a plurality of driving element groups for an electro-mechanical energy conversion element bonded to the elastic body. The electro-mechanical energy conversion element has an electrode which is patterned such that cuts thereof coincide with the nodes of the standing wave generated in the elastic body.

12 Claims, 4 Drawing Sheets

VIBRATION WAVE DRIVEN MOTOR

This application is a continuation of application Ser. No. 07/578,230 filed Set. 6, 1990.

BACKGROUND OF THE INVENTION

1. Field of the Invention

The present invention relates to a vibration wave drivenmotor. More particularly, the present invention pertains to the arrangement of an electrode pattern for an electro-mechanical energy conversion element, such as a piezo-electric element, bonded to an elastic body.

2. Related Background Art

The basic structure of a vibration wave driven motor which utilizes a travelling vibration wave will be described schematically with reference to FIGS. 7 and 8.

In FIGS. 7 and 8, a reference numeral 1 denotes an elliptical elastic body which serves as a vibration body and which consists of straight portions and curved portions. The elastic body is made of an elastic material, such as a metal. In the case where the vibration wave driven motor is employed as, for example, a sheet conveyance means for a printer, it will be arranged such that a sheet can be conveyed linearly by the straight portion. A reference numeral 2 designates an electro-mechanical energy conversion element, such as a PZT, which consists of straight portions and curved portions. Hereinafter, the electro-mechanical energy conversion element is typified by a piezo-electric element. An electrode film 3, made of Cu, Ni or Ag, is bonded to the two surfaces of the piezo-electric element 2 by means of printing or deposition. The electrode film 3 bonded to the rear surface of the piezo-electric element (which is not bonded to the elastic body) has a pattern having cuts 3A. The electrode film 3 formed on the front surface of the piezo-electric element 3 (which is bonded to the elastic body) has no cuts and thus forms an overall surface electrode.

The electrode pattern 3 formed on the rear surface of the piezo-electric element 2 will be further described below with reference to FIG. 8. The example illustrated in FIG. 8 produces a travelling wave which is a combination of two sets of standing waves each of which is characterized by the presence of six points of successive maxima and minima in the peripheral direction. The electrode pattern 3 shown in FIG. 8 includes a first driving electrode group consisting of electrodes 3a1 and 3a2, a second driving electrode group consisting of electrodes 3b1 and 3b2, a grounding electrode 3G and sensor electrodes 3Sa and 3Sb which respectively detect vibrations generated by the first and second electrode groups. Each electrode in both the first and second electrode groups has a length equal to one half of the wavelength and is disposed at a pitch equal to one half of the wavelength. The first electrode group is shifted from the second electrode group by a distance which is an odd multiple of one quarter of the wavelength. The cuts are formed in a radial fashion in each of the curved portions. The portions of the piezo-electric element 2, which correspond to the respective driving electrodes 3a1, 3a2, 3b1 and 3b2 in the first and second electrode groups, develop polarization in the direction of its thickness. At that time, the portions of the piezo-electric element 2, corresponding to the electrodes 3a1 and 3a2 in the first electrode group, develop polarization in opposite directions. Similarly, the portions of the piezo-electric element 2, corresponding to the electrodes 3b1 and 3b2 in the second electrode group, develop polarization in opposite directions. That is, when a voltage having the same polarity is applied to the first electrode group, the portions of the piezo-electric element 2 corresponding to the electrodes 3a1 and 3a2 develop polarization such that they are expanded or contracted in opposite directions. The same thing applies to the portions of the piezo-electric element 2 corresponding to the electrodes 3b1 and 3b2.

Thus, supply of voltages which are out of phase by 90° to the electrode groups generates in the elastic body 1 a travelling wave which is a combination of two sets of standing waves and which frictionally drives a moving body (not shown), such as a sheet or a rotor, pressed to the elastic body 1. If the moving body is made fixed, the elastic body 1 is made movable.

The above elliptical elastic body has two vibration modes. FIGS. 9 and 10 are respectively contour maps of deviation generated in the two vibration modes, obtained by the characteristic value analysis in the finite element method. The vibration mode shown in FIG. 9 is obtained by driving the first electrode group and the vibration mode shown in FIG. 10 is provided by driving the second electrode group. Deviation represents a component in a direction perpendicular to the surface of the piezo-electric element 2. The contour lines shown in FIGS. 9 and 10 are those of the surface of the piezo-electric element. Deviation is normalized with the maximum value as "1."

As is clear from the contour maps of FIGS. 9 and 10 and the electrode pattern shown in FIG. 8, the nodes of the vibrations (indicated by thick lines in FIGS. 9 and 10) shift from the cuts in the electrode pattern (see FIG. 8). As a result, the force which generates deviation also acts on the nodes, thus reducing efficiency of the motor.

SUMMARY OF THE INVENTION

An object of the present invention is to provide a vibration wave driven motor which is capable of eliminating the aforementioned problem of the conventional art and thus preventing reduction in the efficiency.

Other objects of the present invention will become apparent from the following description taken in conjunction with the accompanying drawings.

To achieve the above objects, the present invention provides a vibration wave driven motor of the type which produces a travelling wave in an elastic body and thereby moves the elastic body relative to a member pressed against the elastic body. The travelling wave generated in the elastic body is a combination of a plurality of standing waves generated by application of out-of-phase alternate electric fields to a plurality of driving element groups for an electro-mechanical energy conversion element bonded to the elastic body. The electro-mechanical energy conversion element has an electrode which is patterned such that cuts thereof coincide with the nodes of the standing wave generated in the elastic body. dr

DETAILED DESCRIPTION OF THE PREFERRED EMBODIMENTS

First Embodiment

Figure 1:
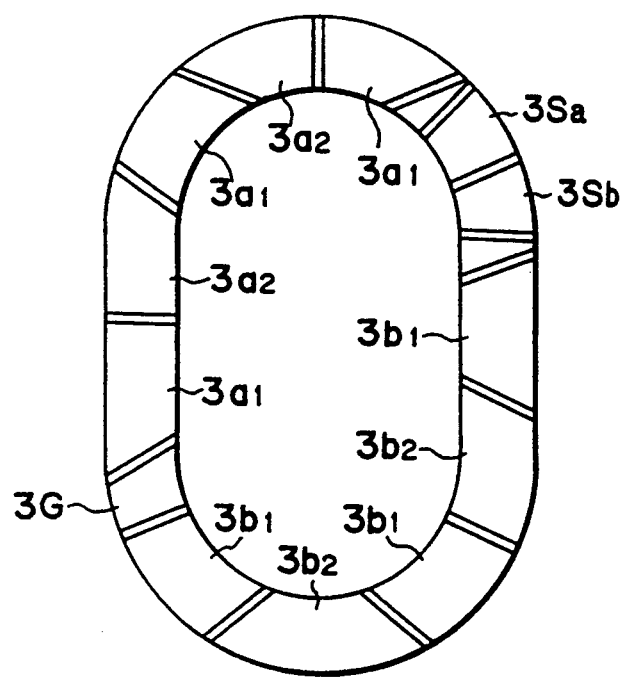
FIG. 1 shows an electrode pattern in a first embodiment of the present invention.
Figure 7:
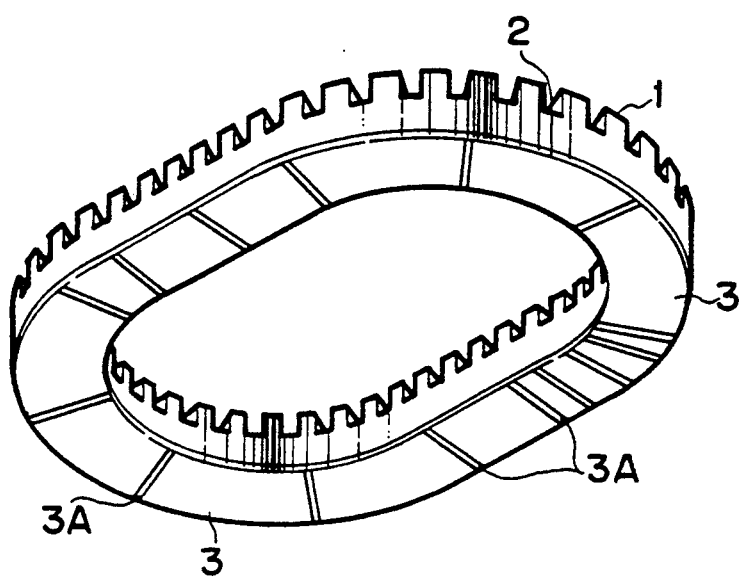
FIG. 7 is a perspective view of a conventional vibrating body.
Figure 8:
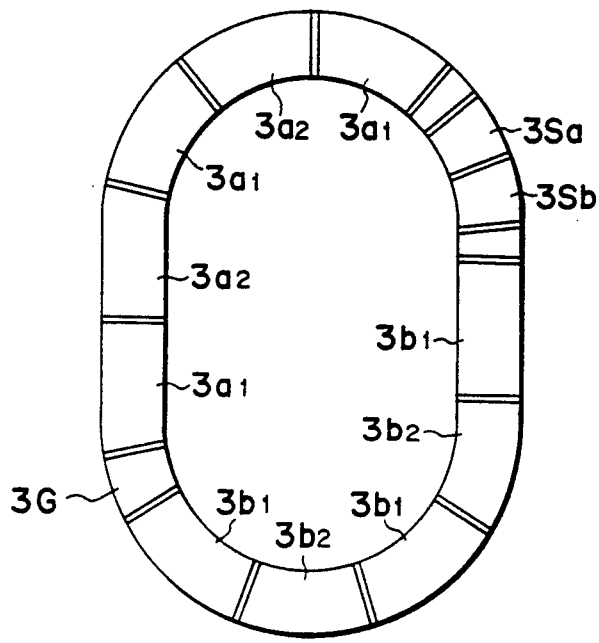
FIG. 8 shows an electrode pattern for the vibrating body of FIG. 7.
Figure 9:
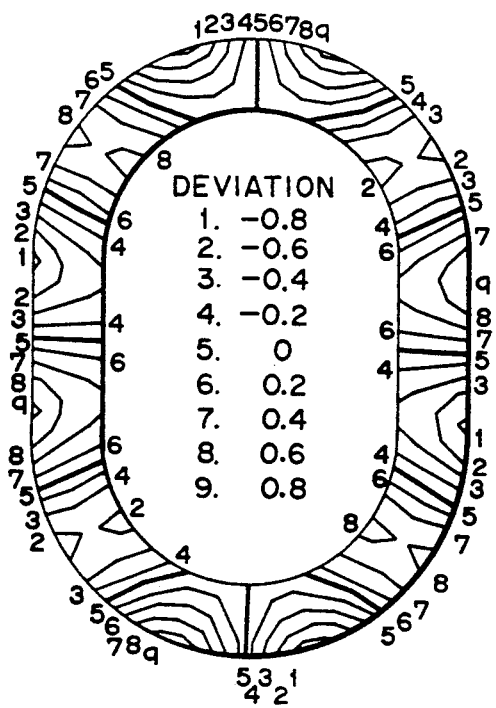
FIGS. 9 and 10 are contour maps of deviation generated in the two standing wave modes, obtained by the characteristic value analysis of the finite element method.
Figure 10:
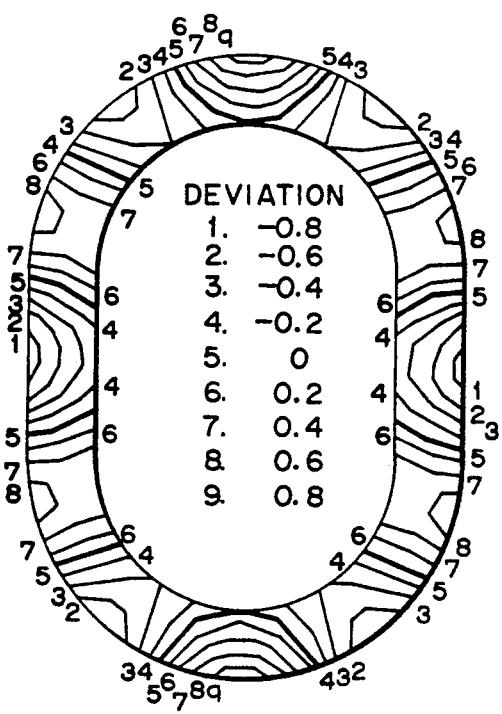

FIG. 1 shows the electrode pattern for the piezo-electric element (e.g., a PZT) which is the electro-mechanical energy conversion element bonded to the elliptical elastic body. In this embodiment, the cuts in the first electrode group 3a1 and 3a2 are made to correspond to the nodes (indicated by the thick lines) of the vibrations generated in the vibration mode shown in FIG. 9, and cuts in the second electrode group 3b1 and 3b2 face the nodes (indicated by the thick lines) of the vibrations generated in the vibration mode shown in FIG. 10. One of the sensor electrodes 3Sa is made to correspond to the node (indicated by the thick lines) of the vibrations generated in the vibration mode shown in FIG. 10, and the other sensor electrode 3Sb faces the node (indicated by the thick lines) of the vibrations generated in the vibration mode shown in FIG. 9. The other structure of the first embodiment is the same as that of the conventional example shown in FIGS. 7 and 8.

In consequence, no shift exists between the respective electrodes in the first and second electrode groups and the vibration modes (standing waves), and the force which generates deviation does not act on the portions of the piezo-electric element which are to become nodes of the vibrations, thus preventing reduction in the efficiency of the motor. An increase in the motor efficiency may also be expected by the formation of the cuts in the first or second electrode group at positions where they face the nodes shown in FIG. 9 or 10.

Second Embodiment

Figure 2:
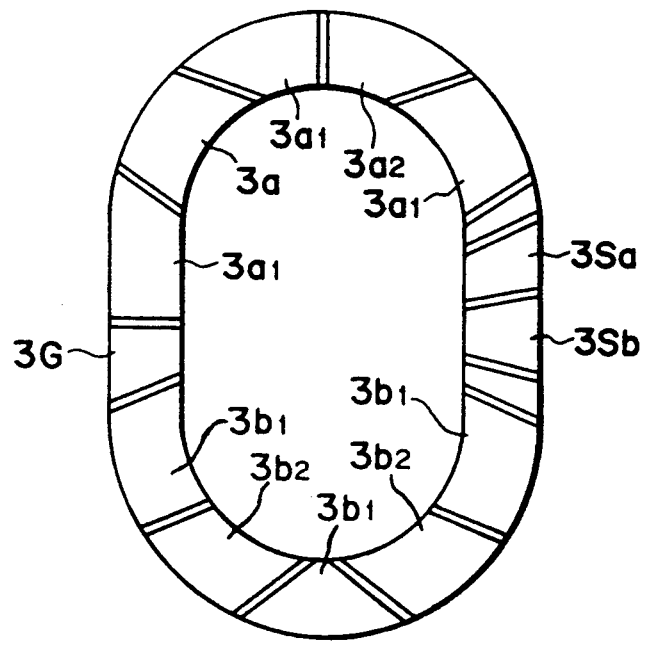
FIG. 2 shows an electrode pattern in a second embodiment of the present invention.

FIG. 2 shows a second embodiment of the present invention which is applied to a driving unit of a paper feeding device in a printer.

In a case where the elliptical vibration wave driven motor is employed as a driving unit for feeding paper in a printer, one of the straight portions of the elastic body is pressed against a sheet of paper which is to be conveyed. In that case, since it is desirable that the sensor electrodes 3Sa and 3Sb detect vibrations in the straight portion of the elastic body which are used for controlling the moving speed of the sheet, the sensor electrodes are disposed on the straight portion. The first and second electrode groups 3a1, 3a2, 3b1 and 3b2 are disposed in the same manner as that of the above-described first embodiment.

Third Embodiment

Figure 3:
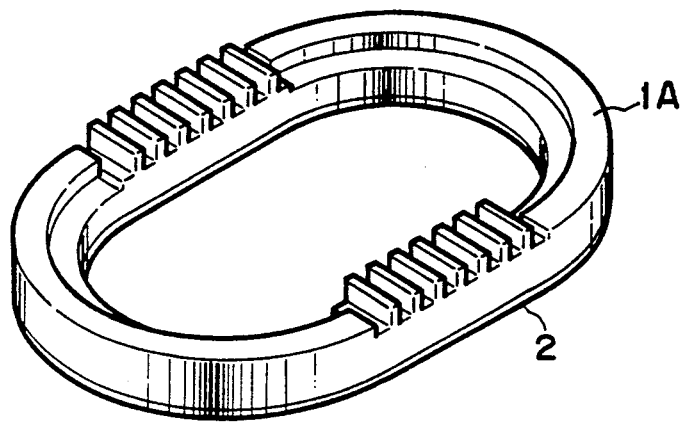
FIG. 3 is a perspective view of an elastic body, showing a third embodiment of the present invention.
Figure 6:
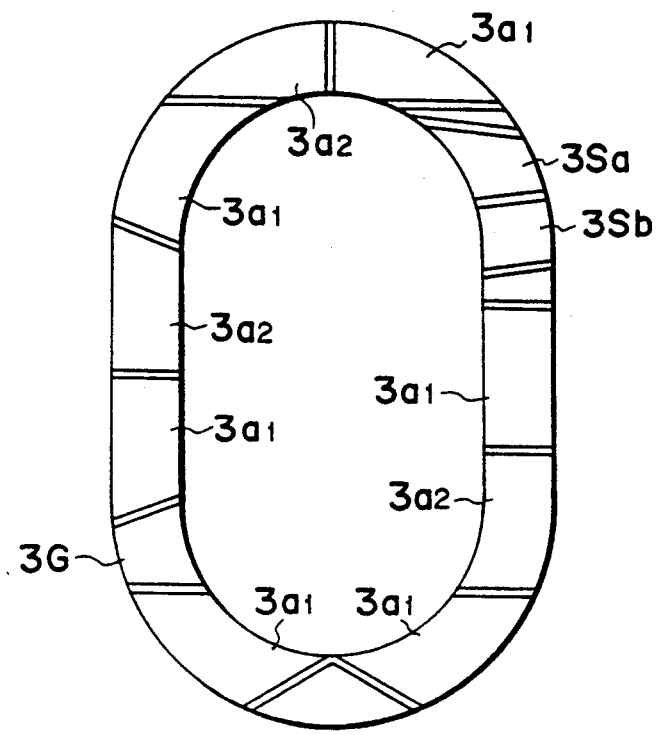
FIG. 6 shows an electrode pattern in the third embodiment of the present invention.

FIG. 3 is a perspective view of the elastic body of a third embodiment of the present invention, and FIG. 6 shows an electrode pattern of the third embodiment.

In an elastic body 1A of this embodiment, the cross-section of the curved portions has a form shown in FIG. 3 so as to eliminate a twisting component of the vibrations generated in the straight portions. The two vibration modes of the third embodiment are shown in FIGS. 4 and 5.

Figure 4:
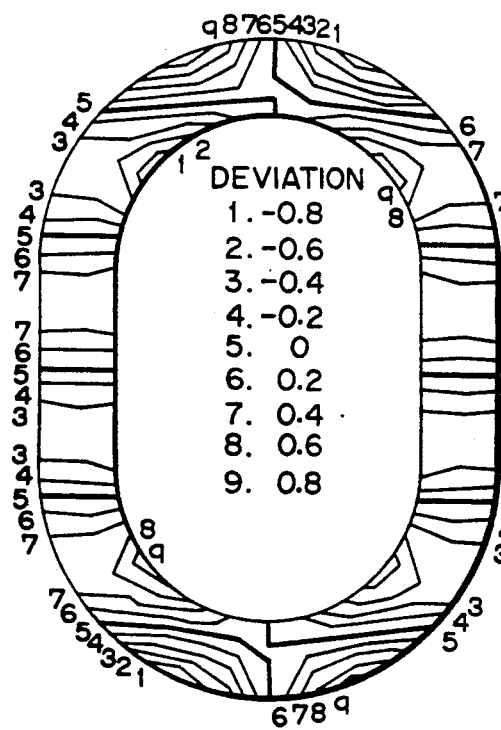
FIGS. 4 and 5 are contour maps of deviation generated in two standing wave modes, obtained by the characteristic value analysis of the finite element method.
Figure 5:
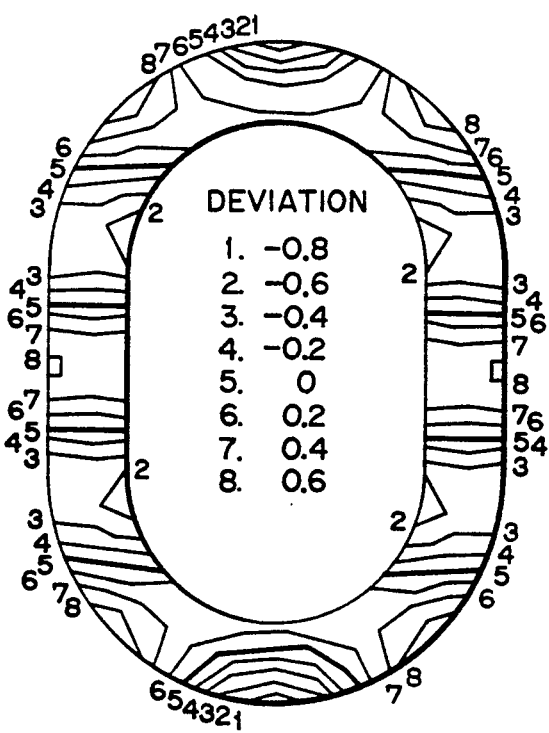

In order to achieve the vibration modes shown in FIGS. 4 and 5, the piezo-electric element has an electrode pattern shown in FIG. 6.

It may also be arranged such that the vibration body with the piezo-electric element bonded thereto is made movable while the moving member for moving, for example, a sheet or film is made fixed, as in the case of the conventional one.

As will be understood from the foregoing description, according to the present invention, the cuts in the electrode pattern for the electro-mechanical energy conversion element, such as a piezo-electric element, are made to correspond to or substantially made to correspond to the nodes of the standing waves generated in the elastic body. It is therefore possible to generate a travelling vibration wave efficiently.

What is claimed is:

1. A travelling vibration wave driven motor, comprising:
   (a) a vibration member having a non-uniform rigidity; and
   (b) electro-mechanical energy conversion means provided in contact with said vibration member, said electro-mechanical energy conversion means including a first electro-mechanical energy conversion element and a second electro-mechanical energy conversion element, said first electro-mechanical energy conversion element being provided with an electrode group for supplying the element with a first electrical signal for generating a first standing wave in said vibration member in response to the first electrical signal, said second electro-mechanical energy conversion element being provided with an electrode group for supplying the element with a second electrical signal for generating a second standing wave in said vibration member in response to the second electrical signal, wherein at least one of said electrode groups is provided with an asymmetrical configuration of gaps formed therein, and wherein each gap provided in said at least one electrode group is located substantially coincident with a respective node of the corresponding standing wave.

2. A travelling vibration wave driven motor according to claim 1, wherein each of the respective electrodes for said two conversion elements is provided with gaps formed therein substantially coincident with the nodes of its corresponding standing wave.

3. A travelling vibration wave driven motor according to claim 1, wherein said vibration member has an annular form which consists of straight portions and curved portions.

4. A vibration driven actuator comprising:
   (a) a vibration member having a non-uniform rigidity; and
   (b) electro-mechanical energy conversion means provided in contact with said vibration member, said electro-mechanical energy conversion means including a first electro-mechanical energy conversion element and a second electro-mechanical energy conversion element, said first electro-mechanical energy conversion element being provided with an electrode group for supplying the element with a first electrical signal for generating a first standing wave in said vibration member in response to the firs electrical signal, said second electro-mechanical energy conversion element being provided with an electrode group for supplying the element with a second electrical signal for generating a second standing wave in said vibration member in response to the second electrical signal, wherein at least one of said electrode groups is provided with an asymmetrical configuration of gaps formed therein, and wherein each gap provided in said at least one electrode group is located substantially coincident with a respective node of the corresponding standing wave.

5. A vibration driven actuator according to claim 4, wherein each of the respective electrodes for said two conversion elements is provided with gaps formed therein substantially coincident with the nodes of its corresponding standing wave.

6. A vibration driven actuator according to claim 4, wherein said vibration member has an annular form which consists of straight portions and curved portions.

7. A travelling vibration wave driven motor, comprising:
    (a) a vibration member having a non-uniform rigidity; and
    (b) electro-mechanical energy conversion means provided in contact with said vibration member, said electro-mechanical energy conversion means including a first electro-mechanical energy conversion element and a second electro-mechanical energy conversion element, said first electro-mechanical energy conversion element being provided with an electrode group for supplying the element with a first electrical signal for generating a first standing wave in said vibration member in response to the first electrical signal, said second electro-mechanical energy conversion element being provided with an electrode group for supplying the element with a second electrical signal for generating a second standing wave in said vibration member in response to the second electrical signal, wherein the electrode group of at least one of said electrode groups is provided with an asymmetrical configuration of gaps formed therein, and wherein each gap provided in the electrode group of said at least one conversion element is located substantially coincident with a respective node of the corresponding standing wave, and wherein a combination of said two standing waves generates in said vibrating member a travelling vibration wave, whereby relative movement is caused between said vibration member and a frictional member in contact with said vibration member.

8. A travelling vibration wave driven printer, comprising:
    (a) a vibration member having a non-uniform rigidity; and
    (b) electro-mechanical energy conversion means provided in contact with said vibration member, said electro-mechanical energy conversion means including a first electro-mechanical energy conversion element and a second electro-mechanical energy conversion element, said first electro-mechanical energy conversion element being provided with an electrode group for supplying the element with a first electrical signal for generating a first standing wave in said vibration member in response to the first electrical signal, said second electro-mechanical energy conversion element being provided with an electrode group for supplying the element with a second electrical signal for generating a second standing wave in said vibration member in response to the second electrical signal, wherein the electrode group of at least one of said electrode groups is provided with an asymmetrical configuration of gaps formed therein, and wherein each gap provided in the electrode group of said at least one conversion element is located substantially coincident with a respective node of the corresponding standing wave.

9. A travelling vibration wave driven apparatus according to claim 8, wherein each of the respective electrodes for said two conversion elements is provided with gaps formed therein substantially coincident with the nodes of its corresponding standing wave.

10. A travelling vibration wave driven apparatus according to claim 8, wherein said vibration member has an annular form which consists of straight portions and curved portions.

11. A travelling vibration wave driven apparatus according to claim 10, further comprising:
    a sensor provided in said straight portion of said vibration member for detecting vibrations i said vibration member, for controlling a movement of a sheet.

12. A vibration wave driven motor, comprising:
    (a) a loop-shaped vibration member having a non-uniform rigidity; and
    (b) energy conversion means coupled with said vibration member for generating a vibration wave in said vibration member in response to first and second signals applied thereto, said energy conversion means having a first electro-mechanical energy conversion element including an electrode group for producing a first standing wave in said vibration member in response to said first signal and a second electro-mechanical energy conversion element including an electrode group for producing a second standing wave in said vibration member in response to said second signal, wherein the electrode group of at least one of said first and second conversion elements is provided with an asymmetrical configuration of gaps formed therein, and wherein each gap provided in the electrode group of said at least one conversion element is located substantially coincident with a respective node of the corresponding standing wave.

* * * * *

UNITED STATES PATENT AND TRADEMARK OFFICE
CERTIFICATE OF CORRECTION

PATENT NO. : 5,274,294
DATED : December 28, 1993
INVENTOR(S) : ATSUSHI KIMURA, ET AL.

It is certified that error appears in the above-indentified patent and that said Letters Patent is hereby corrected as shown below:

COLUMN 1
    Line 10, "drivenmotor" should be --driven motor--.

COLUMN 2
    Line 60, "dr" should be deleted.

COLUMN 5
    Line 4, "firs" should be --first--.

COLUMN 6
    Line 36, "i" should be --in--.

Signed and Sealed this

Twenty-eighth Day of June, 1994

Attest:

BRUCE LEHMAN

*Attesting Officer*    *Commissioner of Patents and Trademarks*